(12) United States Patent
Eliasson

(10) Patent No.: US 7,347,506 B2
(45) Date of Patent: Mar. 25, 2008

(54) ARRANGEMENT AND METHOD FOR ACTIVATING AN EMERGENCY BRAKE FUNCTION WITHIN A VEHICLE

(75) Inventor: Göran Eliasson, Braås (SE)

(73) Assignee: Volvo Construction Equipment AB (SE)

( * ) Notice: Subject to any disclaimer, the term of this patent is extended or adjusted under 35 U.S.C. 154(b) by 0 days.

(21) Appl. No.: 10/065,643

(22) Filed: Nov. 5, 2002

(65) Prior Publication Data

US 2003/0090148 A1  May 15, 2003

Related U.S. Application Data

(63) Continuation of application No. PCT/SE01/00942, filed on May 3, 2001, now abandoned.

(30) Foreign Application Priority Data

May 5, 2000 (SE) .................... 0001644

(51) Int. Cl.
*B60T 13/74* (2006.01)
(52) U.S. Cl. .............. 303/3; 303/15; 303/122.15; 303/9.63; 303/9.66
(58) Field of Classification Search ............ 303/3, 303/7, 9, 15; 188/112 R
See application file for complete search history.

(56) References Cited

U.S. PATENT DOCUMENTS

| | | | | |
|---|---|---|---|---|
| 3,617,096 A | * | 11/1971 | Grabb et al. ............ 303/9 |
| 3,838,895 A | * | 10/1974 | Deem .................. 303/84.2 |
| 4,128,276 A | * | 12/1978 | Beck et al. .............. 303/13 |
| 4,586,584 A | * | 5/1986 | Auman et al. .......... 180/271 |
| 4,919,496 A | | 4/1990 | Burgdorf et al. ......... 303/114 |
| 5,036,961 A | * | 8/1991 | Eberling et al. ......... 477/186 |
| 5,294,190 A | * | 3/1994 | Feldmann et al. ......... 303/3 |
| 6,206,489 B1 | * | 3/2001 | Schmidt et al. ....... 303/122.08 |
| 6,312,060 B1 | * | 11/2001 | Lipscomb et al. .......... 303/9 |
| 6,527,348 B2 | * | 3/2003 | Jensen ................. 303/9.63 |

FOREIGN PATENT DOCUMENTS

| | | |
|---|---|---|
| DE | 3919041 A1 | 12/1990 |
| DE | 19632863 A1 | 2/1998 |
| EP | 0415689 A1 | 3/1991 |
| EP | 0937618 A2 | 8/1999 |

* cited by examiner

Primary Examiner—Bradley King
(74) Attorney, Agent, or Firm—Novak Druce + Quigg

(57) ABSTRACT

Method and apparatus for activation of an emergency brake function (8; 8') within a vehicle (1) when a first brake circuit and a second brake circuit are out of order. A first sensor (20; 20') is included for detecting whether the pressure ($p_1$) in the first brake circuit falls below a first limit value ($p_{1G}$). A second sensor is included (21; 21') for detecting whether the pressure ($p_2$) in the second brake circuit falls below a second limit value ($p_{2G}$). A valve arrangement is provided (16; 24, 25, 26) for activating the emergency brake function if the pressure ($p_1$) in the first brake circuit falls below the first limit value ($p_{1G}$) at the same time as the pressure ($p_2$) in the second brake circuit falls below the second limit value ($p_{2G}$).

6 Claims, 2 Drawing Sheets

ARRANGEMENT AND METHOD FOR ACTIVATING AN EMERGENCY BRAKE FUNCTION WITHIN A VEHICLE

CROSS REFERENCE TO RELATED APPLICATIONS

The present application is a continuation of International Application No. PCT/SE01/00942, filed 3, May 2001 and published in English pursuant to PCT Article 21(2), now abandoned, and which claims priority to Swedish Application No. 0001644-4 filed 5, May 2000. Both applications are expressly incorporated herein by reference in their entireties.

BACKGROUND OF INVENTION

1. Technical Field

The present invention relates to an arrangement for activating an emergency brake function for a vehicle in dependence of whether a regular brake function, comprising a first brake circuit and a second brake circuit, is out of order. The invention also relates to a method for such activation of an emergency brake function.

2. Background Art

The transportation of heavy loads, such as that often performed commercially by contractors, can and is frequently performed using vehicles of the articulated hauler type. These types of vehicles may be chosen because of their capabilities to operate with large and heavy loads in areas where there are no roads. Example settings for such implementation include load transport in connection with road and tunnel building, sand pits, mines and similar environments.

These types of articulated haulers are typically constructed with a forward vehicle section, often referred to as the engine unit and including a forward frame that supports an engine and a front wheel axle. Further, haulers of this type normally have a rear vehicle section taking the form of a load-carrying unit including a rear frame that supports two wheel axles, a forward bogie axis and a rear bogie axis. The vehicle is commonly designed for switching between operations using various driving wheel combinations, all six wheels on the three axes being selectively operable as driving wheels, depending on the prevailing operating conditions. An articulated hauler may have a weight in the order of 15-30 metric tons and may be loaded with a payload in the order of 20-35 tons.

In a typical articulated hauler, the frame of the engine unit is connected to the frame of the load-carrying unit by means of a special articulation joint. This joint allows the engine unit and the load-carrying unit to pivot in relation to each other about an imaginary longitudinal axis essentially extending in the longitudinal direction of the vehicle. This articulation joint also allows pivoting about a vertical axis for steering of the vehicle. In this manner, the engine unit and the load-carrying unit are allowed to move substantially independently of each other. This reduces the stress loads acting on the vehicle, especially when operating in difficult or complex terrain.

Normally, an articulated hauler is equipped with a diesel engine and an automatic transmission having, for example, six forward gear ratios and two reverse gear ratios. For braking of the vehicle, an operating brake system is used, preferably of the hydraulic type and divided into two circuits; one circuit intended for the engine unit and another circuit intended for the load-carrying unit. The brake system includes conventional disc brakes arranged for braking the respective wheels. With respect to the transmission, there is normally an integrated retarder; that is, an hydraulic brake device that acts on a turbine shaft of the transmission for braking the vehicle.

During braking of the hauler, the driver uses a brake pedal designed in such a way that when depressed, it initially causes activation of a retarder. When depressed further, the mechanical or operating brakes are also activated and caused to operate in cooperation with the retarder. The reason for first activating the retarder is to help control the high thermal loads affecting the operating brake during mechanical braking. Thus, by primarily using the retarder, or at least initially using the retarder, reduced wear of the operating brake system is achieved and an increased operator braking comfort is also realized.

Such haulers are also often suitably equipped with a separate retarder pedal that, when depressed, will only cause braking by means of the retarder.

Further, the hauler normally includes an additional brake function in the form of a motor-brake that is a typically occurring braking function of diesel engines. A motor-brake is controlled by means of a separate control and includes a throttle that, when actuated, will restrict the flow of exhaust gases from the engine during its exhaust phase. This creates a back pressure in the exhaust system that in turn causes a braking effect.

A further brake function utilized in an articulated dumper includes a parking brake that is commonly arranged for being activated in order to assure that a stationary and parked vehicle will not move. A parking brake of this nature is typically arranged so as to act, when actuated, upon a cardan shaft extending rearwards from the engine to the load-carrying unit. More specifically, such a parking brake conventionally includes a brake caliper acting on a brake disc that is in turn fitted on the cardan shaft. The parking brake can be activated by the driver, preferably through a lever or a control in connection with the driver's seat in the vehicle.

Parking brakes of a spring brake type are also utilized in which a clamping action is caused by a spring force. This type of brake is normally released by means of a compressed air circuit, by the aid of which the spring force can be overcome so as to release the brake. The parking brake receives the compressed air supply from a compressor provided on the vehicle, via a compressed air container and a parking brake valve that are arranged in connection with the previously discussed control which can be activated by the driver.

Beside the general purpose of actuating the parking brake in connection with parking the dumper, there is a requirement for using the parking brake as an emergency brake in case the normal operating brake system should cease to function. More specifically, there can be a requirement for automatic actuation of the parking brake because the driver may not always make a correct determination of when the emergency brake should be used.

A problem can also arise if the parking brake is actuated while driving along because this would result in a sudden retardation of the vehicle's movement, usually with the potential for causing personal injury and/or equipment damage. For this reason, it is desirable to avoid inadvertent activation of the parking brake. A spurious fault, however, such as a broken cable or other simple type system fault in the vehicle's electrical system can also result in a command for actuation of the parking brake being issued, and care should be taken to assure that such unintended actuation commands do not lead to application of the emergency brake when not really intended, necessary and/or could disturb driving of the vehicle.

As such situations should be avoided, there is need for improved systems that prevent the parking brake from being automatically activated when not needed.

SUMMARY OF INVENTION

One object of the present invention is to provide an improved arrangement for activating the brake function of a vehicle, especially an articulated dumper, whereby the problems discussed above are resolved. In an exemplary embodiment, the invention takes the form of an arrangement for activation of an emergency brake function of a vehicle in dependence of whether a regular brake function is out of order. The arrangement includes a first brake circuit and a second brake circuit, as well as a first sensor for detecting whether an operating pressure in the first brake circuit falls below a first limit value. A second sensor for detecting whether the pressure in the second brake circuit falls below a second limit value. A means for activation of the emergency brake function is also included in case the pressure in the first brake circuit falls below the first limit value at the same time as the pressure in the second brake circuit falls below the second limit value.

Through the invention, an advantage is achieved in that it allows for safe activation of an emergency brake function and a reduced risk of activating the emergency brake function unnecessarily; that is, when not needed.

Advantageous embodiments of the invention are described in the subsequent dependent claims.

BRIEF DESCRIPTION OF DRAWINGS

The invention will be explained more fully in the following, with reference to a preferred embodiment, of which the enclosed drawings illustrate an example.

DETAILED DESCRIPTION

Figure 1:
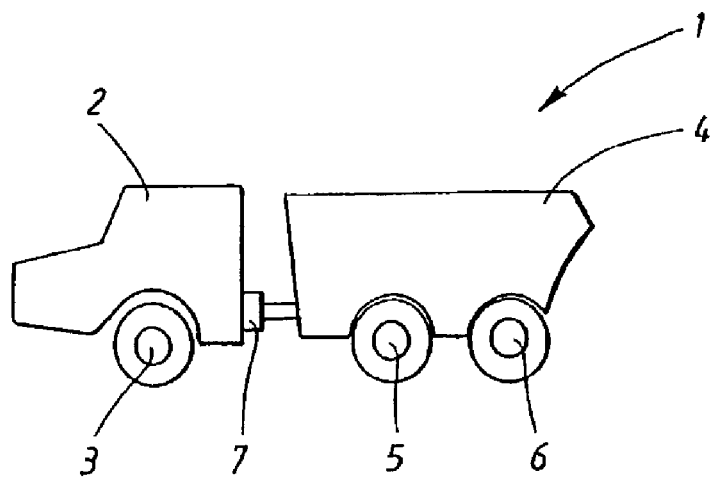
FIG. 1 shows, in principle, an articulated dumper with which the invention can be utilized.

FIG. 1 shows a very simplified side elevational view of an articulated dumper 1 with which the present invention is exemplarily intended to be utilized. The invention should be understood, however, not to be limited for use with this specific kind of vehicle, but can in principle be used with all kinds of vehicles where there is a need for secure activation of an emergency brake function, especially for preventing the emergency brake function from being applied unnecessarily.

FIG. 1 thus illustrates an articulated dumper 1 of conventional design. In the following, the vehicle will not be described in detail, but only the components and functions of the vehicle necessary for an understanding of the present invention(s).

Conventionally, the dumper 1 includes an engine unit 2 with a front wheel axle 3. The dumper 1 also includes a load-carrying unit 4 having two wheel axles, for example, a forward bogie axle 5 and a rear bogie axle 6. The engine unit 2 and the load-carrying unit 4 are interconnected via a special articulation joint 7 that allows the engine unit 2 and the load-carrying unit 4 to move substantially independently of each other in a known manner.

All wheel axles 3, 5, 6, can be braked by an operating brake system, preferably arranged in the form of two brake circuits. More particularly, the two brake circuits typically take the form of a first brake circuit intended for the engine unit 2 and a second brake circuit intended for the load-carrying unit 4. In a conventional manner, the operating brake system includes disc brakes acting on the respective wheel of the dumper 1.

In addition to the operating brake system, the vehicle is also preferably equipped with further brake functions such as a retarder that be conventionally integrated into the transmission of the dumper 1 and arranged adjacent to the vehicle engine on the engine unit 4. A further brake function in the form of an engine brake is also preferably provided on the dumper 1. Conventionally, the engine brake includes a throttle, controlled by a control member, utilized to prevent the outflow of exhaust gases from the engine during the exhaust phase. This creates a back pressure in the exhaust system, which in turn can be used to brake the vehicle. The retarder, as well as the engine brake, can be activated by the driver by means of suitable controls. Furthermore, the retarder and the engine brake can, if necessary, be activated automatically by means of a dedicated control unit.

The dumper 1 also includes a further brake function in the form of a parking brake. As is conventionally known, the parking brake includes a brake caliper acting on a brake disc, and which in turn is attached to a cardan shaft extending from the engine of the dumper to the load-carrying unit 4 for driving the wheel axles 5, 6 of the load-carrying unit 4. The parking brake can be activated by the driver, preferably through a lever or other type of control conveniently positioned close to, or incorporated with a driver's seat in the engine unit 2 of the vehicle 1.

Figure 2:
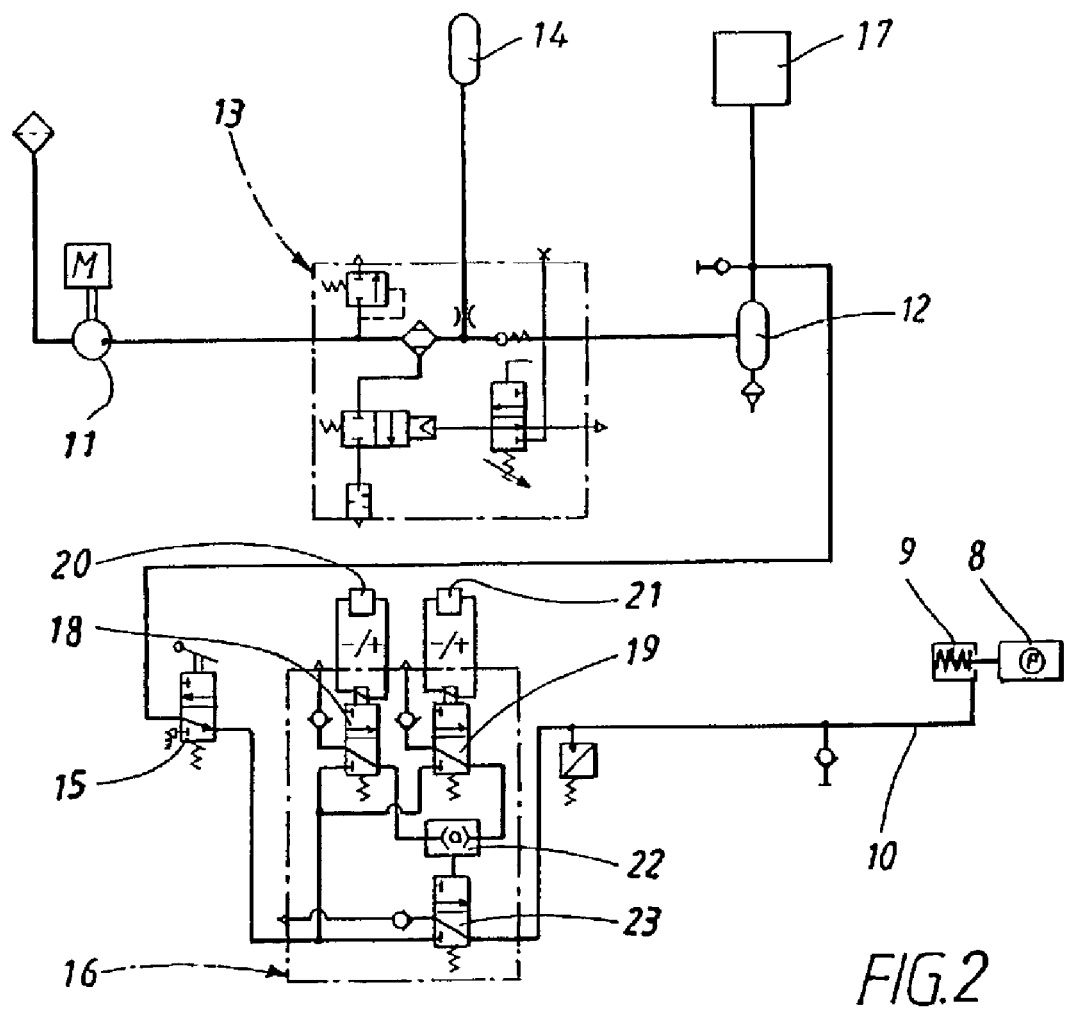
FIG. 2 shows, in block diagram form, the functional principle of the invention, with reference to a first embodiment.

FIG. 2 schematically illustrates, in detail, how the compressed air system of the dumper 1 is configured, and how the invention may be used for actuation and release of a parking brake 8 of the dumper. According to this embodiment, the parking brake 8 is a spring type brake, meaning that it is applied by means of the force from a powerful spring 9 and is released by means of compressed air delivered via a compressed air circuit 10. When releasing the parking brake 8, the spring force of the spring 9 is thus overcome by means of supplied compressed air. When this supplied compressed air is released or evacuated and the pressure drops to atmospheric pressure, the parking brake will be re-applied, the spring 9 thereby pushing a push rod and causing a mechanical clamping of an included brake disc.

The compressed air circuit 10 receives its compressed air supply from a compressor 11 provided in the dumper 1 and that is connected to a reservoir 12 via a compressed air regulator 13. There is also a regeneration tank 14 connected to the compressed air regulator 13. From the first reservoir 12, the compressed air circuit is connected to the parking brake 8 via a parking brake valve 15 and a special valve arrangement 16, to be described in detail below. From the reservoir 12, there is also a connection to other compressed air consumers in the dumper. These additional air consumers are indicated symbolically by the reference number 17. Such further compressed air consumers can, for example, include of a differential lock device, an engine brake, a horn or similar functions. Furthermore, the parking brake valve 15 is preferably arranged in connection with a control means; for example, a lever that is conveniently made available for operation by the vehicle driver.

The valve or emergency brake actuation arrangement 16 will now be described in detail. It is a basic principle behind the invention that the valve arrangement 16 includes a first valve 18 that is adapted to assume a first position or a second position depending on a detected value relating to the pressure $p_1$ prevailing in the first brake circuit; that is, the brake circuit arranged in the engine unit 2 of the vehicle 1. Similarly, the invention preferably includes that the valve arrangement 16 has a second valve 19 that is adapted to assume a first position or a second position depending on a detected value relating to the pressure $p_2$ prevailing in the second brake circuit; for example, the brake circuit arranged in the load-carrying unit 4 of the vehicle 1. To this end, valves 18, 19, are connected to a first pressure sensor 20 for detecting the pressure $p_1$ in the first brake circuit, and a second pressure sensor 21 for detecting the pressure $p_2$ in the second brake circuit, respectively. The valves 18, 19 are of conventional design and each includes a solenoid that can be energized to set the valve to a first position thereby establishing fluid pressure disconnect valving, each valve being biased toward a second position by means of a biasing member, preferably in the form of a spring, when the solenoid is not energized.

The first valve 18 and the second valve 19 are connected, via a shuttle valve 22, to a third or vent valve 23. In an exemplary embodiment of the invention, the three valves 18, 19, 23 and the shuttle valve 22 are interconnected in such a way that the third valve 23 assumes a first position when both the first valve 18 and the second valve 19 are set to a first position. In this configuration, it is indicated that the respective pressures $p_1$, $p_2$ in each brake circuit fall below their predetermined limit values, $p_{1G}$ and $p_{2G}$, respectively. Further, the third valve 23 will assume a second position if either one of the first valve 18 or the second valve 19 assume a position indicating that their respective limit pressures $p_{1G}$, $p_{2G}$, are exceeded. In other words; the third valve 23 will assume the first position if both of the two brake circuits have ceased to function, and will assume the second position if at least one of the two brake circuits is working properly.

FIG. 2 illustrates the function of the invention, more specifically in a condition where the parking brake 8 is actuated and the compressed air is not holding the spring 9 back as is normal when the parking brake 8 is actuated. The air pressure lines have been evacuated to atmospheric pressure via the third valve 23, which to this end has assumed a vent position in which the compressed air connection leading to the parking brake 8 is connected to the atmosphere via the third valve 23 acting as a bleed or vent valve. This situation thus corresponds to an emergency situation in which both vehicle brake circuits have ceased to function; that is, the brake pressure in both of the respective brake circuits has fallen below their respective limit values $p_{1G}$, $p_{2G}$.

The third valve 23 has assumed its first position through compressed air having been fed via the parking brake valve 15, as shown in FIG. 2, up to the first valve 18 and to the second valve 19. In the illustrated condition, the pressure sensors 20, 21 have detected that the brake pressure in each brake circuit has fallen below its respective limit value $p_{1G}$, $p_{2G}$, causing the first and second valves 18, 19 to be in a state corresponding to that which permits no compressed air to be conducted on to the third valve 23. As long as this condition prevails, no compressed air will be fed up to overcome the force of the spring 9. Thus, the parking brake 8 will remain actuated as long as this condition remains.

This is based upon the initially stated requirement of actuating a parking brake in an emergency situation corresponding to the pressures within both brake circuits falling below a certain value. This applies because the dumper can normally be operated, at least for a short while, with only one brake circuit functioning, even if the other brake circuit is out of order.

If, for example, the first pressure sensor 20 should indicate that the pressure $p_1$ in the first brake circuit is higher than its corresponding limit value $p_{1G}$, this will entail that the first valve 18 will assume a position in which compressed air is fed the parking brake valve 15 and up to the shuttle valve 22. From there, the compressed air is fed on to the third valve 23, which is then actuated to assume a position where a compressed air connection is created from the parking brake valve 15, via the third valve 23 and up to the parking brake 8. More specifically, compressed air will then be fed up to, and overcome the force of the spring 9 thus releasing the parking brake.

A corresponding sequence of events applies if the second pressure sensor 21 should indicate that the pressure $p_2$ in the second brake circuit is higher than its corresponding limit value $p_{2G}$. In this case, compressed air will be fed from the parking brake valve 15, via the second valve 19, and up to the shuttle valve 22. From there, the compressed air is fed on to the third valve 23 which entails the compressed air being fed via the parking brake valve 15, via the third valve 23 and up to the parking brake 8. In analogy with what has been explained above, this entails that the parking brake 8 is released.

Consequently, it can be stated that a basic principle behind the invention is that the parking brake will only be automatically actuated as an emergency brake function if the brake pressures $p_1$, $p_2$ in both brake circuits are excessively low; that is, falls below their limit values $p_{1G}$ and $p_{2G}$, respectively. The invention thus entails that the risk of an unintentional automatic activation of the parking brake can be eliminated, or at least avoided. For example, a fault that would affect only one of the first valve 18 or the second valve 19 would not affect the third valve 23, and thus neither the function of the parking brake 8.

Independently of the state of the valve arrangement 16, the parking brake 8 can also be actuated via manual operation of the parking brake valve 15. When the operator switches the parking brake valve 15 to a position corresponding to the parking brake 8 being actuated, the compressed air acting on and holding back the spring 9 will be evacuated via the parking brake valve 15. In this way the parking brake 8 will be actuated.

Figure 3:
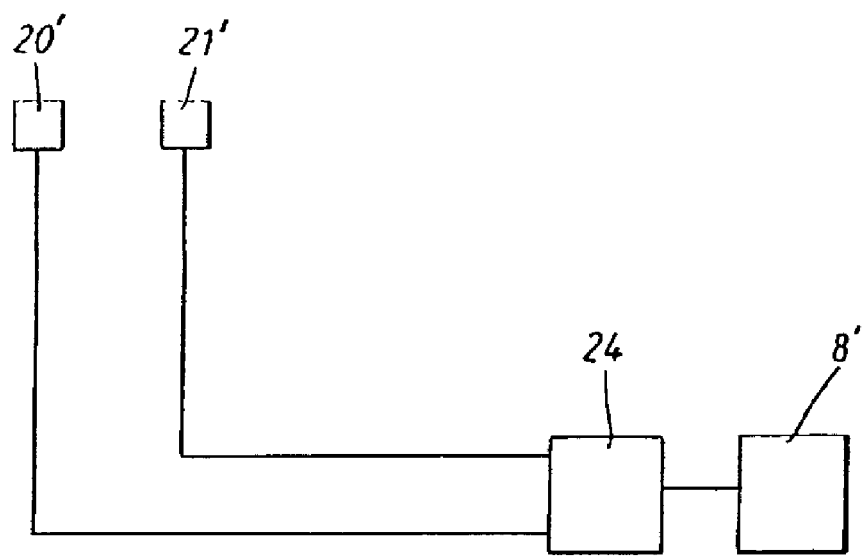
FIG. 3 shows the function of the invention with reference to a second embodiment.

The invention will now be described with reference to a further embodiment, shown in the form of a block diagram, in FIG. 3. Similarly to what has been explained above, this second embodiment includes a first pressure sensor 20' and a second pressure sensor 21', arranged for detecting the respective pressures $p_1$, $p_2$ in the two brake circuits of the vehicle. Each one of the two pressure sensors 20', 21' is connected to corresponding inputs on a first electronic control unit 24. The control unit 24 is preferably computer based and functioning to detect whether the sensed pressure level values $p_1$, $p_2$ in the brake circuits fall below limit values $p_{1G}$, $p_{2G}$, corresponding to those pressure levels at which a proper function of the brake circuits can be guaranteed.

One output of the first control unit 24 is connected to a parking brake 8' and is functioning to activate the same in case the pressures $p_1$, $p_2$ fall below their respective limit values $p_{1G}$, $p_{2G}$. In case the parking brake 8' includes a spring brake of a similar type as the one described above, the control unit 24 is preferably arranged for activating an electrically controllable valve for evacuation of the compressed air counteracting a spring in the parking brake 8'. In this way, the parking brake 8' is actuated.

In a similar manner to that of the embodiment shown in connection with FIG. 2, the parking brake 8' of FIG. 3 will also be actuated in the event that the pressures $p_1$, $p_2$ in both brake circuits of the vehicle have fallen below their respective limit values. Thus, it can be stated that the function of the control unit 24 in FIG. 3 in essence corresponds to the function of the valve arrangement 16 described above with reference to FIG. 2. By analogy with what has been explained above, this will lead to a secure function when activating the emergency brake function.

Figure 4:
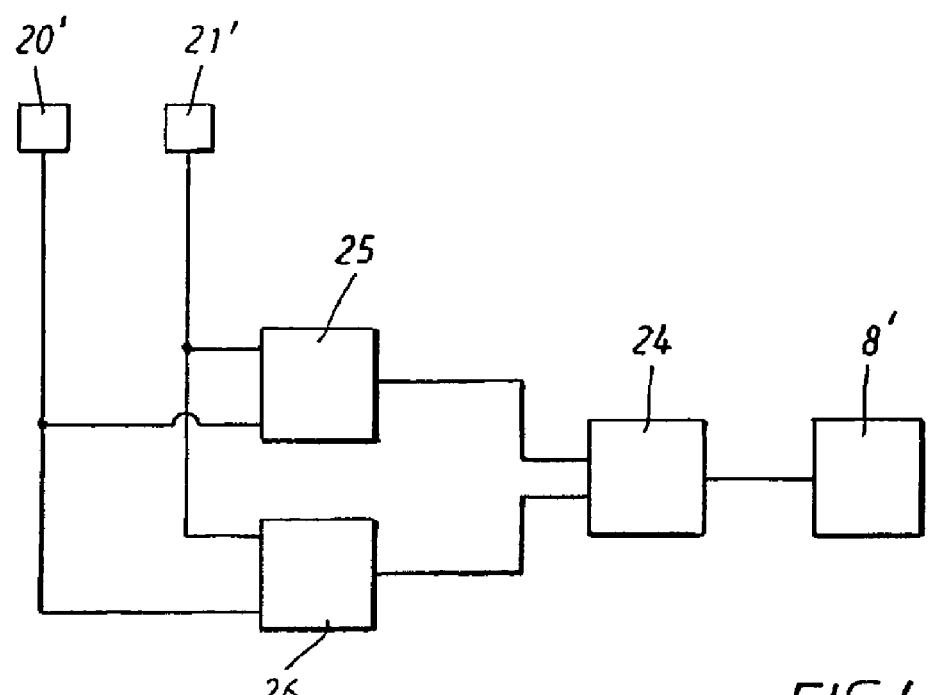
FIG. 4 shows the function of the invention with reference to a third embodiment.

FIG. 4 shows, in block diagram form, a further embodiment of the invention. Similar to that which has been explained above, this third embodiment includes a first pressure sensor 20' and a second pressure sensor 21', arranged to detect the pressures $p_1$, $p_2$ in the two brake circuits of the vehicle in question. Each one of the two pressure sensors 20', 21' is connected to inputs on a second electronic control unit 25 and a third electronic control unit 26, respectively. The two control units 25, 26 are preferably computer based, and are independently functioning to detect whether the sensed pressure level values $p_1$, $p_2$ in the brake circuits fall below limit values $p_{1G}$, $p_{2G}$, corresponding to those pressure levels at which a proper function of the brake circuits can be guaranteed.

One output of the second control unit 25 is connected to a first input of the above-mentioned first control unit 24, whilst one output of the third control unit 26 is connected to a second input of said first control unit 24. The first control unit 24, in analogy with what has been described above with reference to FIG. 3, is functioning to detect signals from the second and third control units, 25 and 26 respectively, thereby indicating whether said pressures $p_1$, $p_2$ fall below their respective limit values $p_{1G}$, $p_{2G}$. If this is the case, the first control unit 24 will activate a parking brake 8'. In case the parking brake 8' is of a spring brake type similar to that described above, the first control unit 24 is preferably arranged for activating an electrically controllable valve for evacuation of the compressed air acting on and holding back a spring in the parking brake 8'. In this way the parking brake 8' will be actuated.

In a similar manner to that of the embodiment shown in connection with FIG. 3, the parking brake 8' according to FIG. 4 will also be actuated in case the pressures $p_1$, $p_2$ in both brake circuits of the vehicle in question have fallen below their respective limit values. By analogy with what has been explained above, this will lead to a secure function when activating the emergency brake function, as the three control units 24, 25, 26, function independently of each other, and as, for example, a fault signal from the second control unit 25 will not automatically entail an actuation of the parking brake 8'. The first control unit 24 will only activate the parking brake if both the second control unit 25 and the third control unit 26 are signaling an excessively low brake pressure.

The invention should be understood not to be limited to the embodiments described above and depicted in the drawings, but may be varied within the scope of the appended claims. For example, the invention can be utilized with various types of vehicles having two brake circuits in which there is a requirement for a secure emergency brake function without any unintentional activation. For example, the invention could be utilized to avoid unintentional actuation of the wheel brakes of a truck or a bus.

The parking brake described above could also be combined with other brake functions and also, for example, with a differential lock.

The invention claimed is:

1. An arrangement for activating an emergency brake (8; 8') within a vehicle (1), the function of which is dependent upon a malfunction detection in a regular brake system of the vehicle, the arrangement comprising:

a first brake circuit and a second brake circuit; and an emergency brake activation means (16; 24, 25, 26) for activating the emergency brake (8; 8') if a pressure ($p_1$) in the first brake circuit simultaneously falls below a first limit value ($p_{1G}$) when a pressure ($p_2$) in the second brake circuit falls below a second limit value ($p_{2G}$), said emergency brake activation means (16; 24, 25, 26) comprising a first sensor (20; 20') configured to detect if pressure ($p_1$) in the first brake circuit falls below the first limit value ($p_{1G}$) and a second sensor (21; 21') configured to detect if pressure ($p_2$) in the second brake circuit falls below the second limit value ($p_{2G}$), the first pressure sensor (20; 20') being connected to a first valve (18) and configured to assume a first position when the pressure ($p_1$) in the first brake circuit falls below the first limit value ($p_{1G}$) and the second pressure sensor (21; 21') being connected to a second valve (19) and configured to assume a first position when the pressure ($p_2$) in the second brake circuit falls below the second limit value ($p_{2G}$), said first and second valves (18, 19) being connected to a third valve (23) adapted to assume a position for actuating said emergency brake (8; 8') when the first valve (17) is in said first position and the second valve (18) is in said first position.

2. The arrangement as recited in claim 1, wherein said emergency brake (8; 8') comprises a parking brake configured to function as said emergency brake (8; 8').

3. The arrangement as recited in claim 1, further comprising a valve device (15) for accommodating manual actuation of said emergency brake (8; 8').

4. The arrangement as recited in claim 1, further comprising a first electronic control unit (24) to which the first sensor (20') and the second sensor (21') are connected, said control unit (24) functioning to activate said emergency brake (8; 8') if the first sensor (20') and the second sensor (21') indicate that the pressure ($p_1$) in the first brake circuit falls below the first limit value ($p_{1G}$) and the pressure ($p_2$) in the second brake circuit falls below the second limit value ($p_{2G}$).

5. The arrangement as recited in claim 4, wherein the first sensor (20') being connected to the first control unit (24) via a second electronic control unit (25), and the second sensor (21') being connected to the first control unit (24) via a third electronic control unit (26), said second control unit (25) and third control unit (26) each functioning to detect whether the pressure in its associated brake circuit falls below their respective limit values ($p_{1G}$, $p_{2G}$), and by the second control unit (25) and the third control unit (26) being connected to the first control unit (24) for activation of said emergency brake (8; 8') if the second control unit (25) and the third control unit (26) indicate that the pressure ($p_1$) in the first brake circuit falls below the first limit value ($p_1$) and the pressure ($p_2$) in the second brake circuit falls below the second limit value ($p_{2G}$).

6. A method for activation of an emergency brake function within a vehicle in dependence of whether a regular brake system of the vehicle that includes a first brake circuit and a second brake circuit is malfunctioning, the method comprising:

providing an arrangement for activating an emergency brake (8; 8') within a vehicle (1), the function of which is dependent upon a malfunction detection in a regular brake system of the vehicle, the arrangement comprising: a first brake circuit and a second brake circuit; and an emergency brake activation means (16; 24, 25, 26) for activating the emergency brake (8; 8') if a pressure ($p_1$) in the first brake circuit simultaneously falls below a first limit value ($p_{1G}$) when a pressure ($p_2$) in the second brake circuit falls below a second limit value ($p_{2G}$), said emergency brake activation means (16; 24, 25, 26) comprising a first sensor (20; 20') configured to detect if pressure ($p_1$) in the first brake circuit falls below the first limit value ($p_{1G}$) and a second sensor (21; 21') configured to detect if pressure ($p_2$) in the second brake circuit falls below the second limit value ($p_{2G}$), the first pressure sensor (20; 20') being connected to a first valve (18) and configured to assume a first position when the pressure ($p_1$) in the first brake circuit falls below the first limit value ($p_{1G}$) and the second pressure sensor (21; 21') being connected to a second valve (19) and configured to assume a first position when the pressure ($p_2$) in the second brake circuit falls below the second limit value ($p_{2G}$), said first and second valves (18, 19) being connected to a third valve (23) adapted to assume a position for actuating said emergency brake (8; 8') when the first valve (17) is in said first position and the second valve (18) is in said first position;

detecting whether said pressure ($p_1$) in the first brake circuit is below said first limit value ($p_{1G}$);

detecting whether said pressure ($p_2$) in the second brake circuit is below said second limit value ($p_{2G}$); and activating of said emergency brake function when the pressure ($p_1$) in the first brake circuit falls below the first limit value ($p_{1G}$) at the same time as the pressure ($p_2$) in the second brake circuit falls below the second limit value ($p_{2G}$) by blocking off fluid pressure supplied to a pressure-actuated emergency brake.

* * * * *